US010110792B2

(12) United States Patent
Benson

(10) Patent No.: US 10,110,792 B2
(45) Date of Patent: Oct. 23, 2018

(54) BACKGROUND REPLACEMENT SYSTEM AND METHODS INVOLVING MULTIPLE CAPTURED IMAGES

(71) Applicant: Lifetouch Inc., Eden Prairie, MN (US)

(72) Inventor: Keith A. Benson, Eden Prairie, MN (US)

(73) Assignee: Lifetouch Inc., Eden Prairie, MN (US)

( * ) Notice: Subject to any disclaimer, the term of this patent is extended or adjusted under 35 U.S.C. 154(b) by 162 days.

(21) Appl. No.: 14/695,506

(22) Filed: Apr. 24, 2015

(65) Prior Publication Data
US 2016/0316118 A1 Oct. 27, 2016

(51) Int. Cl.
*H04N 5/262* (2006.01)
*H04N 5/265* (2006.01)
*H04N 5/272* (2006.01)
*H04N 5/225* (2006.01)
*G06K 9/62* (2006.01)
*H04N 5/235* (2006.01)
*G06K 9/20* (2006.01)
*G06T 7/11* (2017.01)

(52) U.S. Cl.
CPC ......... *H04N 5/2256* (2013.01); *G06K 9/2027* (2013.01); *G06K 9/6202* (2013.01); *G06T 7/11* (2017.01); *H04N 5/2354* (2013.01)

(58) Field of Classification Search
CPC ........ H04N 5/262; H04N 5/265; H04N 5/272; H04N 5/2256; G06K 9/6202; G06T 7/0081
See application file for complete search history.

(56) References Cited

U.S. PATENT DOCUMENTS

| 8,233,785 | B1 | 7/2012 | Surma et al. |
| 8,611,659 | B2 * | 12/2013 | Williams .................. G06T 5/50 382/173 |
| 9,350,924 | B2 * | 5/2016 | Posa ...................... H04N 5/272 |
| 2007/0147820 | A1 * | 6/2007 | Steinberg ............... H04N 5/272 396/155 |
| 2008/0246777 | A1 | 10/2008 | Swanson et al. |
| 2010/0246902 | A1 | 9/2010 | Rowe et al. |

(Continued)

FOREIGN PATENT DOCUMENTS

JP 2000270343 A 9/2000

OTHER PUBLICATIONS

Patent Cooperation Treaty International Searching Authority, International Search Report and Written Opinion for application No. PCT/US2016/028476 mailed on Sep. 1, 2016, 18 pages.

*Primary Examiner* — Tuan Ho
(74) *Attorney, Agent, or Firm* — Merchant & Gould P.C.

(57) ABSTRACT

A method of illuminating a subject during photography is disclosed. The method includes illuminating a background lighting system during a first image capture, illuminating a subject lighting system during a second image capture, and illuminating the background lighting system during a third image capture. The time from the first image capture to the third image capture is less than about 100 milliseconds. Also disclosed is a method for generating a composite mask of a subject, including receiving the three images, determining any movements of the subject between the first and third images, estimating an intermediate position of the subject during the second image, and generating a composite mask at the estimated intermediate position.

19 Claims, 14 Drawing Sheets

(56) References Cited

U.S. PATENT DOCUMENTS

2011/0050938 A1 3/2011 Capata et al.
2013/0265396 A1* 10/2013 Surma ................ H04N 13/0239
                                                                     348/47

* cited by examiner

BACKGROUND REPLACEMENT SYSTEM AND METHODS INVOLVING MULTIPLE CAPTURED IMAGES

BACKGROUND

Professional photographic images are often obtained in an artificially lighted environment. Example types of images captured in this environment include school portraits, printed publication images, product packaging or marketing images, and athletic or club portraits. It is sometimes desirable to change the background behind the subject of the image, which requires additional processing of the image after its capture. Some existing methods for background replacement, such as chroma key, accomplish this objective but the resulting images can lack the crisp precision expected from professionally-captured photographs.

Other background replacement systems rely upon the creation of a mask that identifies the placement of the subject in the image. Techniques for creating the mask work well with very high speed photography methods or with relatively stationary subjects. But when the subject is moving, many camera systems cannot capture images fast enough to allow an accurate mask to be generated.

SUMMARY

In general terms, this disclosure is directed to background replacement system and methods for background replacement in digital photographs. Various aspects are described in this disclosure, which include, but are not limited to, the following aspects.

A first aspect is a method of illuminating a subject during a photography session. The method includes receiving an image capture signal, and after receiving the image capture signal, initiating an illumination sequence for a single image capture sequence. The illumination sequence for a single image capture sequence includes initiating a first illumination of a background using a background lighting system while a first background illuminated image is captured, initiating illumination of the subject using a subject lighting system while a subject illuminated image is captured, and initiating a second illumination of the background using the background lighting system while a second background illuminated image is captured.

The first aspect can be for a single pose of the subject. In the first aspect, the capturing of the images can occur with equal time intervals therebetween, and capturing of the images can occur in less than about 100 milliseconds. The difference between the third time and the first time can also be less than about 20 milliseconds. The image capture signal can be received from a remote control device. Sometimes the background lighting system is not illuminated during the second image capture. Sometimes the subject lighting system is not illuminated during the first image capture and the third image capture.

A second aspect is a method of generating a composite mask. The method can include receiving a first image of a subject representative of a first position of the subject at a first time before an event, receiving a second image of the subject representative of a second position of the subject at a second time after the event, identifying differences between the first image and the second image representative of movement of the subject between the first position and the second position, estimating an intermediate position of the subject at a time of the event based at least in part on the differences between the first image and the second image, the intermediate position being between the first position and the second position, and generating the composite mask identifying the intermediate position of the subject.

Additionally, in the second aspect, the event can be the capturing of a subject-illuminated image of the subject. The second aspect can additionally include using the composite mask to remove a background portion of the subject-illuminated image. The first image of the subject can be a first mask generated from a first background-illuminated image of the subject, and the second image of the subject can be a second mask generated from a second background-illuminated image of the subject. The second background-illuminated image can be captured within less than about 100 milliseconds of the first background-illuminated image capture. Identifying differences between the first image and the second image can include dividing the first mask into a first set of tiles, dividing the second mask into a second set of tiles, and comparing one of the first set of tiles to one or more of the second set of tiles. Comparing one of the first set of tiles to one or more of the second set of tiles can include using a spatial weighting array. Estimating an intermediate position of the subject at the time of the event can include averaging one or more adjacent tiles.

A third aspect is a system for capturing and processing multiple images. The system can include a controller, a lighting system synchronized by the controller, and a mask generation system including a second non-transitory storage medium and one or more processors. The lighting system can include a background lighting system in communication with the controller, a subject lighting system in communication with the controller, and an image capture initiation module.

The controller can include a non-transitory storage medium and one or more processors, the non-transitory storage medium storing instructions that, when executed by the processor, cause the controller to receive an initiation signal from the image capture initiation module, illuminate the background lighting system during a first image capture of the subject at a first time, illuminate the subject lighting system during a second image capture of the subject at a second time, and illuminate the background lighting system during a third image capture at a third time, where each of the first image capture, second image capture, and third image capture are for one pose.

The mask generation system can be configured to receive the first image capture of the subject at the first time, receive the second image capture of the subject at the second time, and receive the third image capture of the subject at the third time. The second non-transitory storage medium can also include instructions that, when executed by the one or more processors, cause the mask generation system to determine any movements of the subject between the first and second images, estimate an intermediate position of the subject at a time of the event between the first time and the second time, and generate the composite mask at the intermediate position of the subject.

In the third aspect, the difference between the third time and the first time can be less than about 100 milliseconds. The difference between the first time and the second time can be equal to a difference between the second time and the third time. Sometimes, the background lighting system is not illuminated during the second image capture, and the subject lighting system is not illuminated during the first image capture and the third image capture. The difference between the third time and the first time can also be less than about 20 milliseconds. The difference between the first time and the second time is equal to a difference between the second time and the third time. Determining any movements of the subject between the first and second images can include generating a first mask using the first image of the subject, generating a second mask using the second image of the subject, and comparing the first mask to the second mask. The system can also include a mirrorless digital camera configured to capture each of the first image, the second image, and the third image, wherein the mirrorless digital camera is in communication with the controller and the mask generation system.

DETAILED DESCRIPTION

Figure 1:
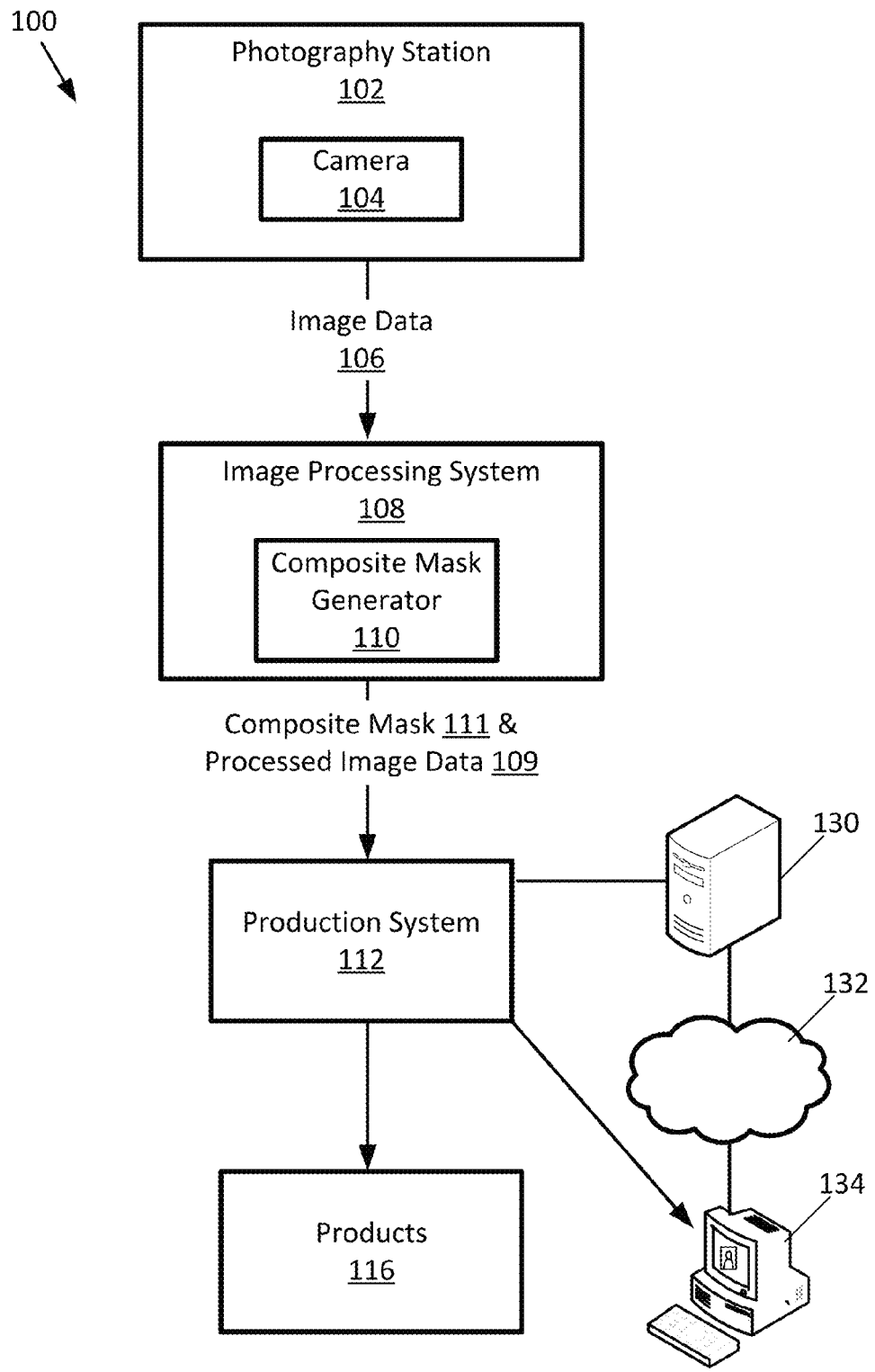
FIG. 1 illustrates an embodiment of a system for producing multiple images of a subject for a pose.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

It is sometimes desirable to customize the background of the image behind the subject. One method is to generate a mask based on a background-illuminated image, where the subject is not illuminated. Then, that mask is effectively placed over the subject in the subject-illuminated image and the background is removed. However, that method does not compensate for subject motion. Oftentimes, a subject is in motion throughout a photography session or sit. For instance, many small children do not remain perfectly still for portraits. Animals may be in motion as well during image capture. Additionally, sometimes it is desirable to have the subject in action, such as a person jumping or a fan blowing a person's hair.

Generally, most digital single lens reflex (DSLR) cameras can capture up to ten frames per second. This image capture rate is too slow to produce two images without subject motion. Mirrorless digital cameras currently have frame rates of up to sixty images captured per second. Even with images captured at a rate of sixty per second, subject motion may still be noticeable and therefore can cause inaccurate background replacement. It is with respect to this general environment that the instant disclosure is directed.

FIG. 1 is a schematic block diagram of an example system 100 for producing photographs. In this example, system 100 includes photography station 102, image processing system 108, and production system 112. In some embodiments, the photography station 102 includes camera 104. In some embodiments, the image processing system 108 includes composite mask generator 110. Photography station 102 is used by a photographer to capture digital photographs of subjects. Examples of subjects include humans, animals, plants, and products or other objects.

Photography station 102 is a structure for photographing a subject to capture a digital image of the subject with camera 104. In some embodiments, photography station 102 is a professional photography studio where photographers take photographs of subjects. In other embodiments, photography station 102 is a mobile photography studio, which is portable so that it can be setup at a remote location, such as in a school, church, or other building or location. Typically the photography station includes one or more backgrounds, one or more lights, and at least one camera 104. An example photography station 102 is shown and described in more detail below. Outdoor photography stations 102 are possible.

Camera 104 is a device that operates to capture an image of one or more subjects in the photography studio. Camera 104 is a mirrorless digital camera. In other embodiments, camera 104 is another type of digital camera capable of capturing at least three images in less than 100 milliseconds. An example of camera 104 is shown and described in more detail below with reference to FIG. 3.

In some embodiments, photography station 102 also includes other devices, such as a computing device. Some embodiments also include a photography control station which interfaces between camera 104 and the computing device. The photography control station, for example, coordinates the operation of the lights, performs some initial processing on digital images received from camera 104 (such as to associate Meta data with the digital images). An example photography station 102 is shown and described below with reference to FIG. 2.

After one or more digital images have been captured, the image data is stored in a computer readable medium. Examples of computer readable media include memory cards (discussed above), a compact disc (CD), a digital versatile disc (DVD), a hard disc of a hard disc drive, or other types of computer readable media.

Image data 106 is next transferred to an image processing system 108. For example, the computer readable medium is brought to the image processing system 108, or is transported through a mail delivery system. In other embodiments, the image data 106 is transferred across a network, such as the Internet (e.g., network 132), a local area network, or a cable connection.

Image processing system 108 is a system that receives the image data 106 and processes the original image data 106 to generate composite mask 111 and image data 106. As discussed below, in some embodiments system 100 includes an image processing system 108 that generates one or more composite masks using the image data 106 received from the photography station 102. Image data 106 are described below, with reference to FIGS. 5 and 6. Example hardware components of the image processing system are shown and described in more detail below with reference to FIG. 7. An embodiment of an example composite mask generator 110 is shown below with reference at least to FIGS. 8-13. The composite mask 111 and image data 109 are subsequently used for further processing, such as to remove the background from a subject-illuminated image and insert a different background behind the subject.

The composite mask 111 data is then stored in a computer-readable medium. In some embodiments, processed image data 109 includes image data 106 as well as additional data defining one or more transformations that can be applied to the original image data 106. In other embodiments, processed image data 109 includes only the additional data pertaining to the image data 106. In some of these embodiments, original image data 106 is separately provided to production system 112. In yet other embodiments, image processing system 108 performs one or more transformations to image data 106 (e.g., cropping), and stores the transformed image data as processed image data 109 without the original image data 106. Examples of transformations include a color correction, a dust correction, a brightness correction, a definition of a crop location, a cropping, a tilt, or other desired transformations or combinations of transformations.

After processed image data 109 has been generated, it is provided to production system 112, which uses the processed image data 109 to produce one or more products 116. Examples of products 116 include marketing or promotional material, a photo mug, a picture book, a photograph, a computer-readable medium storing digital image data, and digital images delivered across network 132. Other examples of products include a composite product (composed of multiple different images), a photo mouse pad, a collage, a key tag, a digital picture frame or digital key chain, a photo card (such as a student identification card, driver's license, holiday or greeting card, security badge, baseball or other sports card, luggage tag, etc.), a photo magnet, an ornament, a puzzle, a calendar, a tote bag, a photo keepsake box, a t-shirt, an apron, or a variety of other products including a photographic image.

In some embodiments, production system 112 includes a web server 130 that is configured to communicate data across a network 132, such as to send products in the form of digital data to a client computing system 134. For example, Web server 130 is in data communication with network 132 and hosts a web site. The network 132 is a digital data communication network, such as the Internet, a local area network, a telephone network, or a smart phone network. A customer uses a client computing system 134 to communicate across the network 132, and accesses the web site of server 130, such as by using a browser software application operating on the client computing system 134. In some embodiments the customer can purchase products through the web site, or can access products that were previously purchased. The products can then be downloaded to client computing system 134, where they are stored in memory. In some embodiments the products continue to be hosted on server 130, but the customer is provided with links that can be inserted into the customer's own web pages or on third party web sites (e.g., Facebook, Instagram, etc.) to allow others to view and/or download the products.

Figure 7:
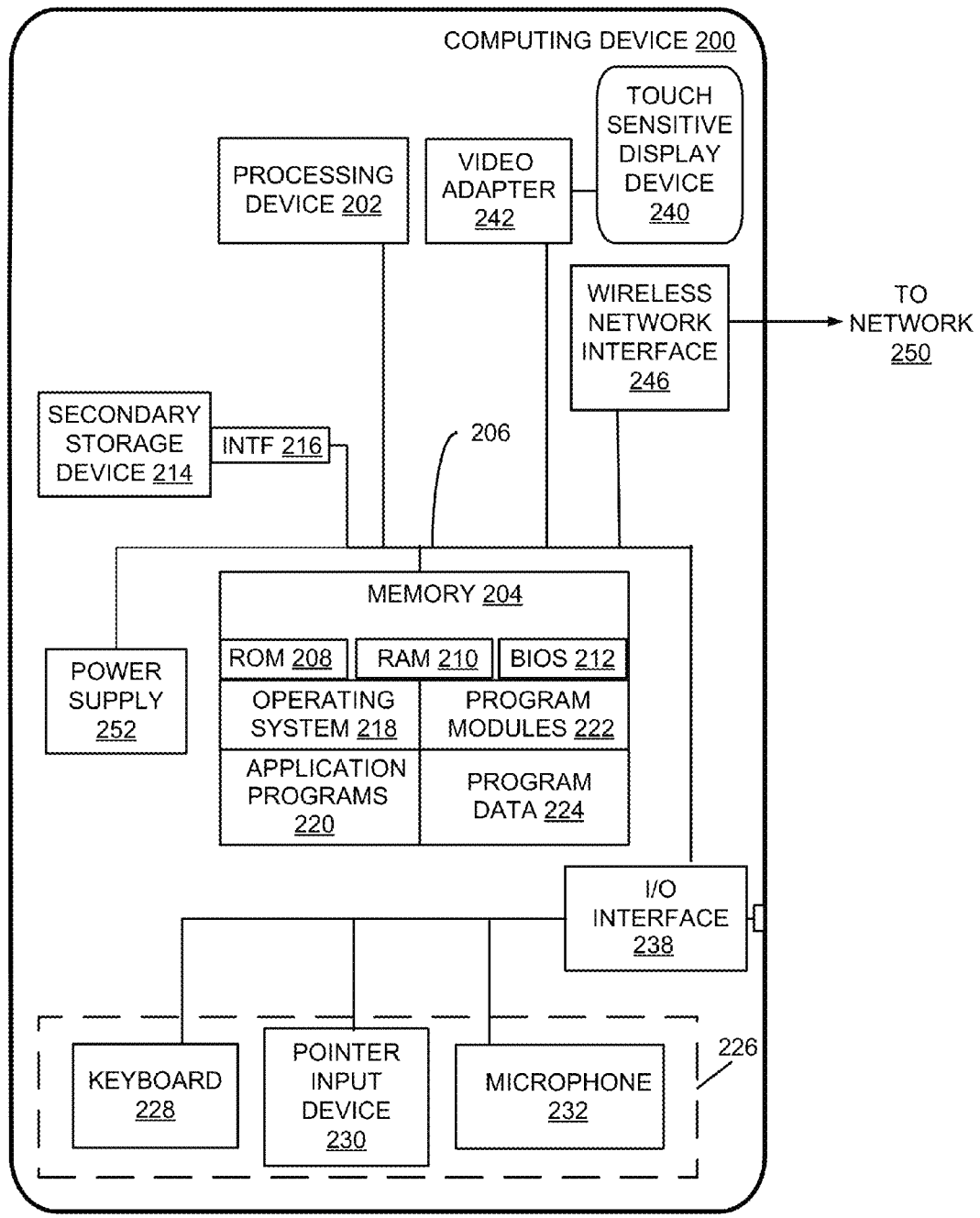
FIG. 7 is a schematic block diagram illustrating an architecture of an example computing device of the photography station shown in FIG. 2.

An example of client computing system 134 is a computing device, such as illustrated in FIG. 7. Some embodiments include client computing systems 134 in the form of a smart phone, a laptop computer, a handheld computer, a desktop computer, or other computing systems.

The above description of system 100 provides examples of some of the possible environments in which an image processing system 108 can be implemented. Other embodiments are implemented in yet other systems or environments. Any of the systems described herein can be implemented by one or more devices as additional embodiments.

Figure 2:
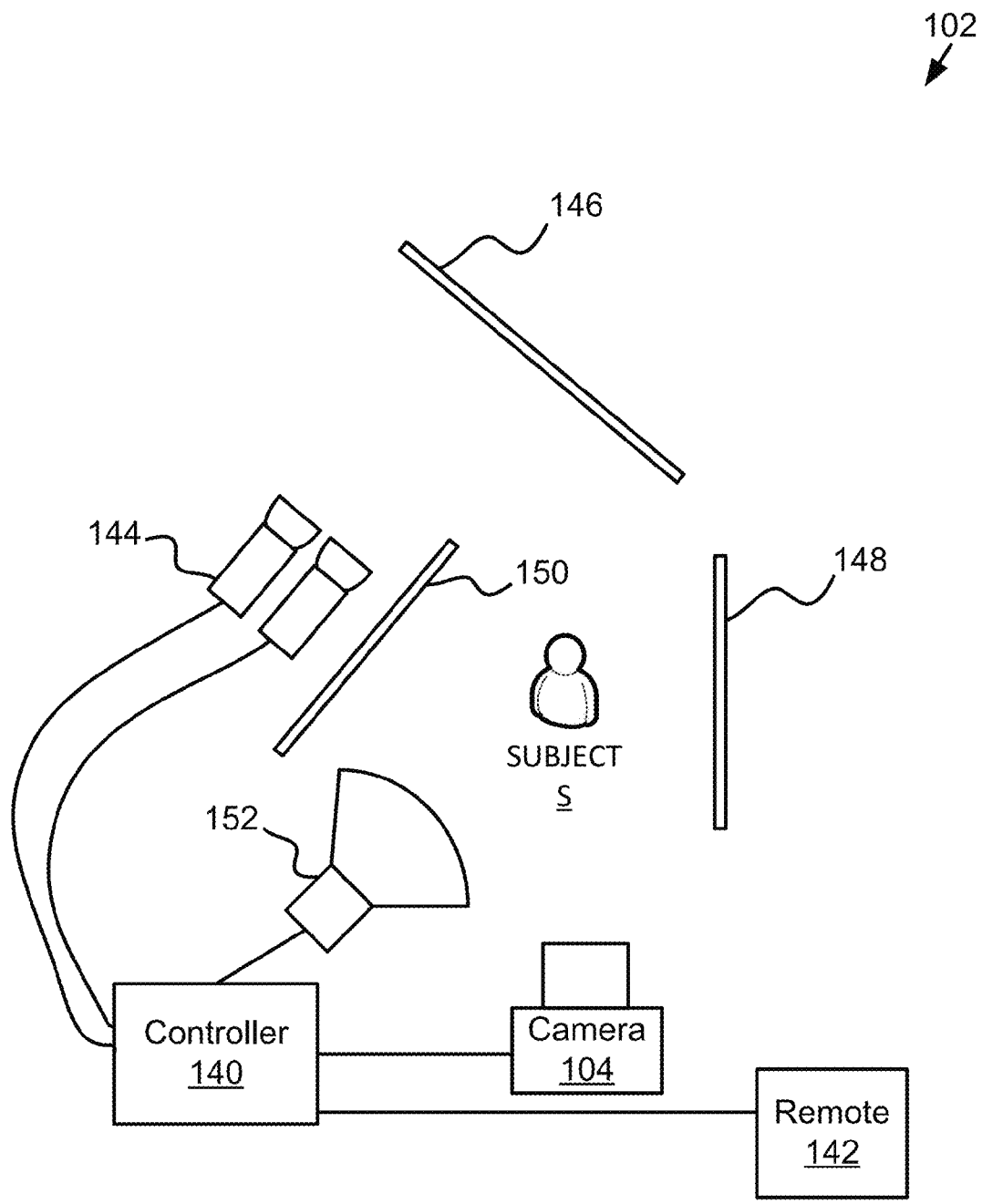
FIG. 2 illustrates an embodiment of a photography station for illuminating and capturing multiple images of a subject for a pose.

FIG. 2 is a block diagram of an embodiment of example photography station 102. The embodiment includes a subject S positioned in front of camera 104 in communication with controller 140, remote control device 142 in communication with controller 140, background lighting system 144, background 146, fill reflector 148, light block 150, and main light 152. Other embodiments can include more or fewer components. The angles, sizes and relative positioning between components in FIG. 2 are not meant to be limiting.

Subject S is one or more of, or a combination of, a person, animal, or object. Camera 104 is a digital camera, examples of which are described in more detail below and particularly with reference to FIG. 3. Camera 104 is in wired or wireless communication with controller 140, which is described in more detail below with reference to FIG. 4.

Remote control device 142 is also in communication with controller 140. Remote control device 142 is used to initiate the image capture sequence described below. Remote control device 142 is in wired or wireless communication with controller 140. For example, remote control device 142 can communicate with controller 140 via infrared signal emission, radio frequency, Bluetooth, Wi-Fi, and other wireless communication protocols known in the art. Remote control device 142 can be a separate physical component with one or more buttons, an interface on a smart computing device such as a smart phone, and a button integrated into camera 104.

Controller 140 synchronizes the illumination of the lighting fixtures 144 and 152 with the image capture of camera 104. Examples of image capture sequences are described below. Background lights 144 are configured to illuminate the background 146 during one or more background-illuminated image captures, described below. In embodiments, background lights 144 include at least two lights, where one light is illuminated for the first background-illuminated image capture and the other light is illuminated for the second background-illuminated image capture, described below.

Typically, background lights 144 include one or more stands to support and elevate the light sources. In addition, the background lights 144 can include one or more light modifiers, such as an umbrella or soft box, which diffuses the light from the light source to provide the desired lighting pattern and distribution. Background lights 144 can be a panel of light emitting diodes, as shown and described in U.S. patent application Ser. No. 13/346,471, the entirety of which is hereby incorporated by reference. Background lights 144 can also be a fast-recharge monolight.

Light block 150 prevents most or all of the light from background lights 144 from illuminating the subject. The background lights are oriented substantially orthogonal to the background 146, although other angles can be used. The background lights 144 and light block 150 are positioned such that they do not appear in the image captured by camera 104.

The background 146 is an object arranged in line with the subject S and the camera 104 to provide a suitable backdrop for images captured by the camera 104. In embodiments, the background 146 is a background structure. The background 146 typically has an exterior surface having a neutral color. In embodiments, the exterior surface has a substantially non-textured dark gray color. However, in other embodiments the exterior surface is textured, and in other embodiments, other colors are used.

The background 146 typically includes a frame or stand that supports the background material having the exterior surface. In some embodiments the background material is substantially opaque, while in other embodiments the background material is translucent. For example, in some embodiments the background lighting system 144 is configured to directly illuminate a rear surface of the background material, and light from the background lighting system 144 passes through the translucent background material, so that it is visible on the exterior surface.

In other embodiments, however, the background 146 is a separate object that is not a part of the photography station 102. Examples of such backgrounds 146 include a wall, a curtain, a whiteboard, or other structure having an exterior surface that can be illuminated by the background lighting system 144. The best results will typically be obtained with a background 146 having a neutral color and little to no visible texture.

In yet another possible embodiment, the background 146 and the background lighting system 144 are the same device. In this example, the background lighting system 144 is positioned behind the subject S and within the view of the camera 104, such that light generated by the background lighting system 144 is directly visible by the camera rather than indirectly illuminating background 146. In some embodiments, the background lighting system 144 includes a display device, such as a flat panel display. Examples of flat panel displays include LED displays, plasma displays, digital light processing displays, and the like, many of which are commonly used as television or computer displays. Such a display can alternatively be arranged behind a background 146 to illuminate the background 146 from behind.

Fill reflector 148 is a screen, panel, light or a substantially flat surface such as a wall. Fill reflector 148 can have low to medium reflective qualities. Generally, pure reflective surfaces, such as a mirrored surface, are not used as a fill reflector. Fill reflector 148 is substantially monochrome and can be a white, off-white or gray color. The fill reflector 148 is a way to provide soft light on the left side of the subject so that the subject-illuminated image does not show shadowing on the subject. In the arrangement shown in FIG. 2, the main light 152 is positioned generally to the right of the subject. In that arrangement, some of the light from main light 152 reflects off the fill reflector 148 and onto the left side of the subject.

Main light 152 operates to provide appropriate foreground illumination of the subject S during a subject-illuminated image capture. Main light 152 can include one or more light sources and additional lighting components, such as a fill lighting system. A variety of different light sources can be used, such as incandescent, fluorescent, high-intensity discharge, and light emitting diode light sources. The controller 140 operates to control the flashing of the main light 152 during the subject-illuminated image capture.

Typically, the main light 152 includes one or more stands to support and elevate the light sources. In addition, in embodiments the main light 152 includes one or more light modifiers, such as an umbrella or soft box, which diffuses the light from the light source to provide the desired lighting pattern and distribution.

Figure 3:
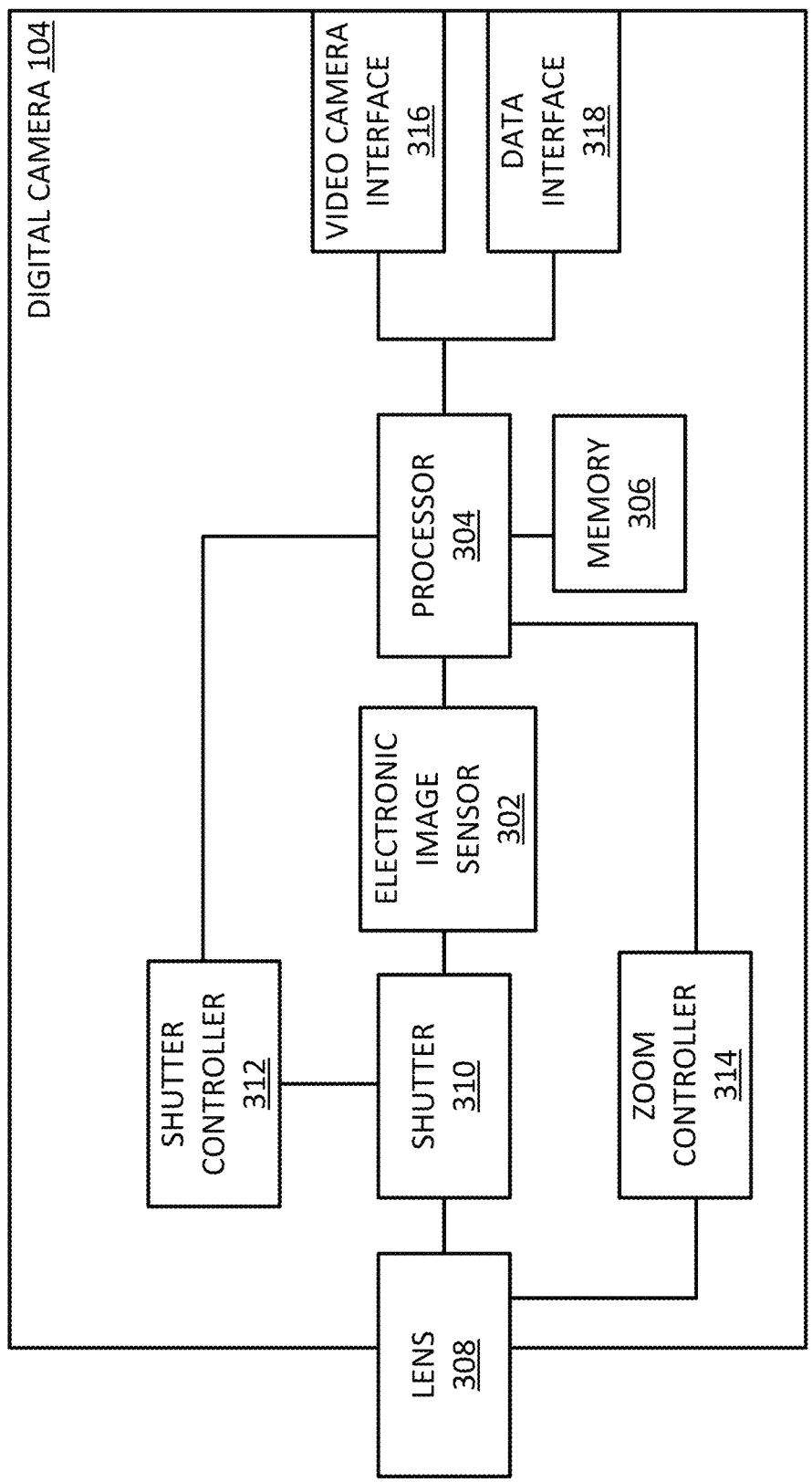
FIG. 3 is a schematic block diagram of an embodiment of a camera of the photography station shown in FIG. 2.

FIG. 3 is a schematic block diagram of an example camera 104. Camera 104 is typically a mirrorless digital camera including at least an electronic image sensor 302 for converting an optical image to an electric signal, a processor 304 for controlling the operation of the camera 104, and memory 306 for storing the electric signal in the form of digital image data. A commercially available example of a mirrorless camera is the Nikon 1V3 available from Nikon Corporation.

An example of electronic image sensor 302 is a charge-coupled device (CCD). Another example of electronic image sensor 302 is a complementary metal-oxide-semiconductor (CMOS) active-pixel sensor. Electronic image sensor 302 receives light from a subject and background and converts the received light into electrical signals. The signals are converted into a voltage, which is then sampled, digitized, and stored as digital image data in memory 306.

Memory 306 can include various different forms of computer readable storage media, such as random access memory. In some embodiments memory 306 includes a memory card. A wide variety of memory cards are available for use in various embodiments. Examples include: a CompactFlash (CF) memory card (including type I or type II), a Secure Digital (SD) memory card, a mini Secure Digital (miniSD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

Lens 308 is located in front of shutter 310 and is selected to provide the appropriate photographic characteristics of light transmission, depth of focus, etc. The shutter 310 can be mechanical, electrical, or both. In some embodiments, lens 308 is selected between 50 and 250 mm, with the image taken at an f-stop generally in the range of f16 to f22; in the range of f4 to f16; or in the range of f4 to f22. This provides a zone focus for the image. It also generally eliminates concerns regarding ambient light. However, it will be appreciated that any number of lenses, focusing, and f-stops may be employed in connection with the present invention.

To initiate the capture of the images, an image capture button on remote control device 142 (shown in FIG. 4) is preferably used. In some embodiments the remote control device 142 is connected to the controller 140, which generates a shutter release signal that is communicated to a shutter controller 312 of camera 104. However, other embodiments use other methods and devices to initiate the image capture. For example, a button, switch or other device might be included on the controller 140 or connected to camera 104. Still further, a computing device, such as image processing system 108, is used in some embodiments to initiate the process.

A zoom controller 314 is also provided in some embodiments to mechanically adjust the lens 308 to cause the digital camera 104 to zoom in and out on a subject. In some embodiments the remote control device 142 (shown in FIG. 4) includes zoom in and out buttons. Signals from the remote control device 142 are communicated to the controller 140, which communicates the request to zoom controller 314 of digital camera 104. The zoom controller 314 typically includes a motor that adjusts lens 308 accordingly.

In some embodiments digital camera 104 includes a video camera interface 316 and a data interface 318. Video camera interface 316 communicates live video data from digital camera 104 to controller 140 (or computing device 200) in some embodiments. In some embodiments, video camera interface 316 communicates live video data from digital camera 104 to a laptop or a digital display on the camera 104.

Data interface 318 is a data communication interface that sends and receives digital data to communicate with another device, such as controller 140 or computing device 200. For example, in some embodiments the data interface receives image capture messages from controller 140 that instruct digital camera 104 to capture one or more digital images. Data interface 318 is also used in some embodiments to transfer captured digital images from memory 306 to another device, such as controller 140 or computing device 200. Examples of video camera interface 316 and data interface 318 are USB interfaces. In some embodiments video camera interface 316 and data interface 318 are the same, while in other embodiments they are separate interfaces.

Figure 4:
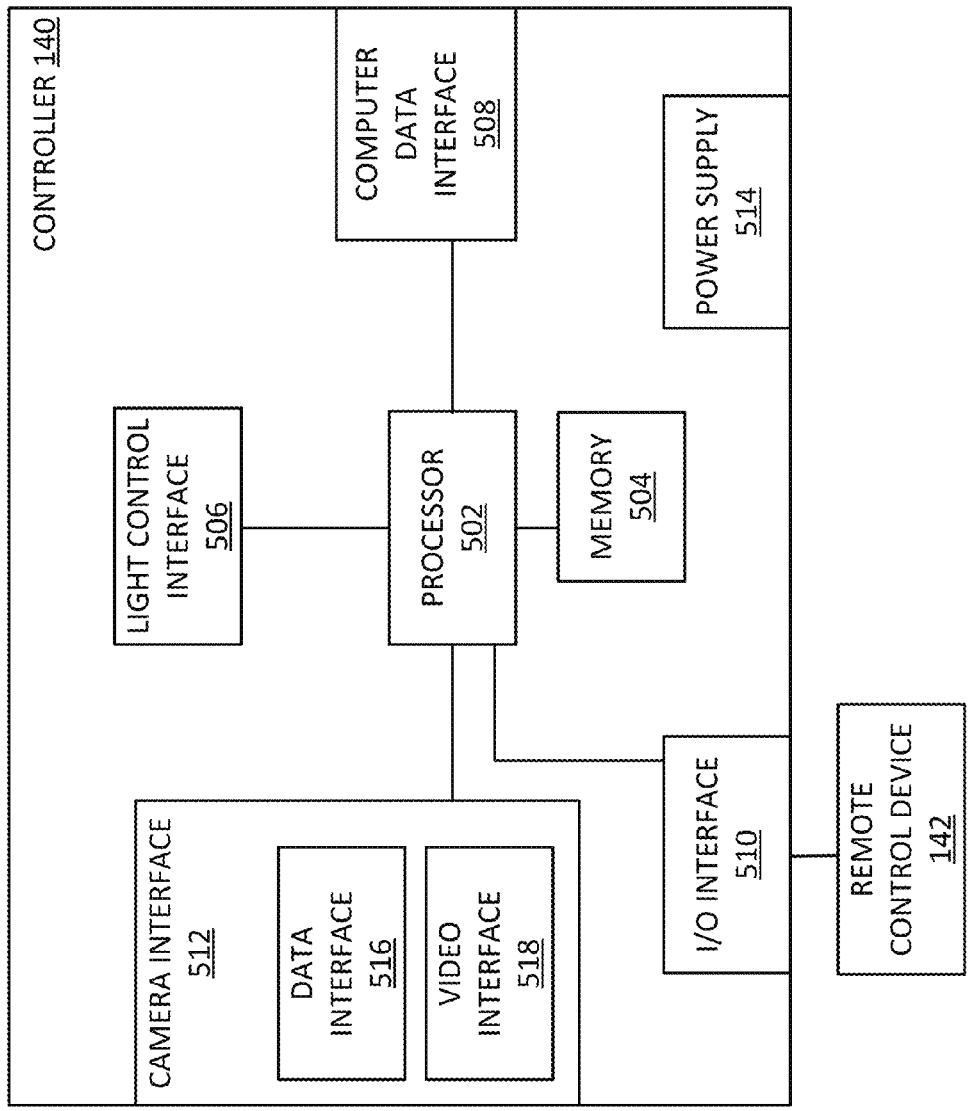
FIG. 4 is a schematic block diagram of an embodiment of a controller of the photography station shown in FIG. 2.

FIG. 4 is a schematic block diagram of an example controller 140. In this example, controller 140 includes one or more processing devices 502, memory 504, light control interface 506, computer data interface 508, input/output interface 510, camera interface 512, and power supply 514. In some embodiments, camera interface 512 includes a data interface 516 and a video interface 518.

Processing device 502 performs control operations of controller 140, and interfaces with memory 504. Examples of suitable processors and memory are described herein.

Light control interface 506 allows controller 140 to control the operation of one or more lights, such as the main light 152, background lights 144 (shown in FIG. 2), and other lights. The connection between the controller 140 and the various lighting components is wired and/or wireless. In some embodiments light control interface 506 is a send only interface that does not receive return communications from the lights. Other embodiments permit bidirectional communication. Light control interface 506 is operable to selectively illuminate one or more lights at a given time. Controller 140 operates to synchronize the illumination of the lights with the operation of camera 104.

Computer data interface 508 allows controller 140 to send and receive digital data with computing device 200. An example of computer data interface 508 is a universal serial bus interface, although other communication interfaces are used in other embodiments, such as a wireless or serial bus interface.

One or more input devices, such as remote control device 142, are coupled to the processing device 502 through input/output interface 510. The input devices can be connected by any number of input/output interfaces 510 in various embodiments, such as a parallel port, serial port, game port, universal serial bus, or wireless interface.

Camera interface 512 allows controller 140 to communicate with camera 104. In some embodiments, camera interface 512 includes a data interface 516 that communicates with data interface 318 of camera 104 (shown in FIG. 3), and a video interface 518 that communicates with video camera interface 316 of camera 104 (also shown in FIG. 3). Examples of such interfaces include universal serial bus interfaces. Other embodiments include other interfaces.

In some embodiments a power supply 514 is provided to receive power, such as through a power cord, and to distribute the power to other components of the photography station 102, such as through one or more additional power cords. Other embodiments include one or more batteries. Further, in some embodiments controller 140 receives power from another device.

Controller 140 is arranged and configured to synchronize the illumination of lights 144 and 152 with the image captures, either through wired or wireless communication. As discussed above, controller 140 can be configured to cause illumination of one of the background lights 144 for a first background-illuminated image capture and then cause the illumination of a second background light 144 for a second background-illuminated image capture. In embodiments, controller 140 provides one or more triggers or pulses to the lights 144 and 152. In other embodiments, controller 140 communicates digital messages that are used to synchronize and control the various operations.

Figure 5:
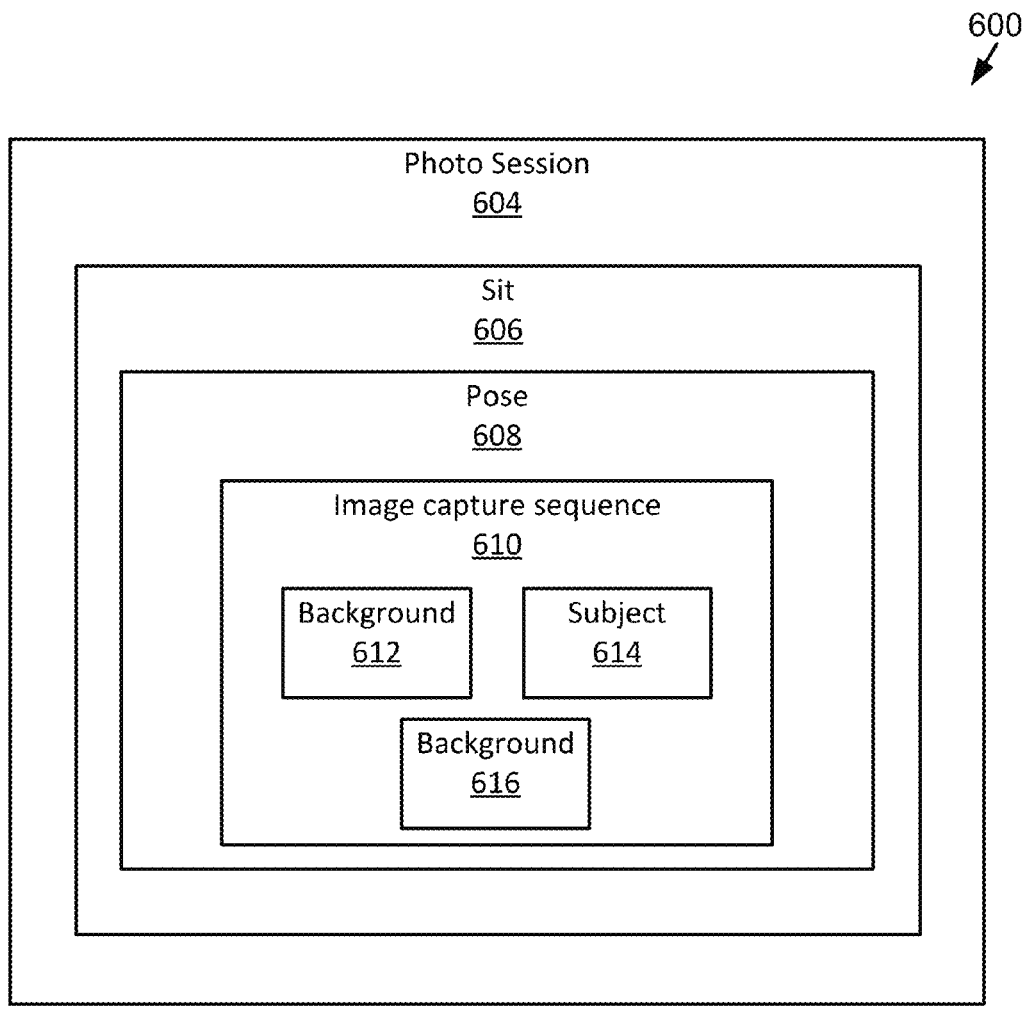
FIG. 5 is a block diagram of an example hierarchy for capturing images.

FIG. 5 is a block diagram illustrating an example photo hierarchy 600. As illustrated, the broadest category is a photo session 604. The photo session 604 includes all the photos taken by one or more photographers at a particular site. The site is a school, club, church, field, photo studio, mall, or other location. The sit 606 includes the photos taken for a particular subject, where the subject is a person, more than one person, product, or other inanimate object. Each sit 606 includes one or more poses 608. A pose 608 is a particular positioning, movement or angle of the subject. For example, one pose 608 for a subject that is a person is standing, a different pose 608 is sitting, another pose 608 is jumping, and still another pose 608 is sitting with arms crossed. That is, a pose 608 includes non-stationary movement. Additionally, the camera angle or zoom can be varied between poses 608.

An image capture sequence 610 includes three or more images captured for each pose 608. For each image capture sequence 610, three or more images are captured: one with the background illuminated 612, one with the subject illuminated 614 and one with the background illuminated 616. An example image capture 610 is shown in more detail in FIG. 6.

Figure 6:
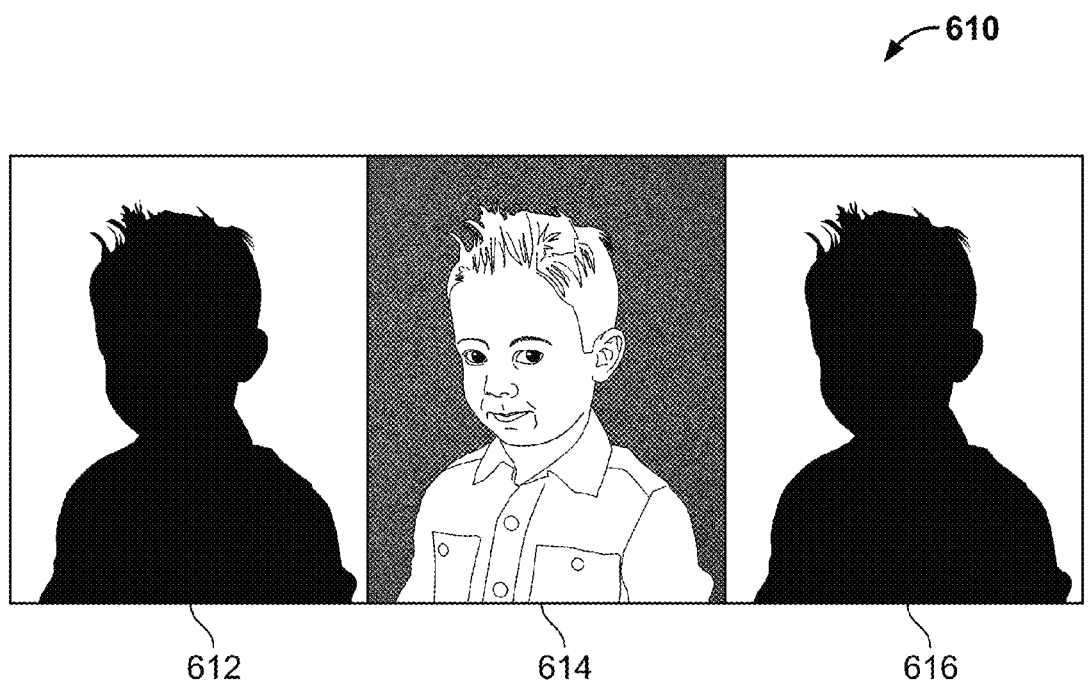
FIG. 6 illustrates an example of three images captured for a single pose of a subject.

FIG. 6 is an embodiment of an example image capture 610. The three images 612, 614 and 616 are captured in quick succession. The image capture 610 can be initiated, for example, by a single button press on remote control device 142. Other embodiments can use different numbers of button presses or different triggers. In the embodiment shown, the first image captured is the background-illuminated 612, the second image captured is the subject-illuminated 614, and the third image captured is the background-illuminated 616. Other embodiments can capture the pictures in a different order.

When the second image 614 is captured, the background lighting has substantially or completely cycled off. When the third image 616 is captured, the subject lighting has substantially or completely cycled off The time from the first image capture 612 to the third image capture 616 is about 2 milliseconds; about 3 milliseconds; about 5 milliseconds; about 8 milliseconds; about 10 milliseconds; about 15 milliseconds; about 20 milliseconds; about 25 milliseconds; about 30 milliseconds; about 40 milliseconds; about 50 milliseconds; about 60 milliseconds; about 80 milliseconds; or about 100 milliseconds.

The time interval between the first image capture 612 and the second image capture 614 is identical or substantially identical to the time interval between the second image capture 614 and the third image capture 616. For example, the time between the first image capture 612 and the second image capture 614, and the time between the second image capture 614 and the third image capture 616 is about 5 milliseconds; about 7.5 milliseconds; about 10 milliseconds; about 12.5 milliseconds; about 15 milliseconds; about 20 milliseconds; about 25 milliseconds; about 30 milliseconds; about 40 milliseconds; or about 50 milliseconds.

FIG. 7 illustrates an exemplary architecture of a computing device that can be used to implement aspects of the present disclosure, including the camera 104, the image processing system 108, the production system 112, web server 130 and computer 134, and will be referred to herein as the computing device 200.

The computing device 200 is used to execute the operating system, application programs, and software modules (including the software engines) described herein.

The computing device 200 includes, in some embodiments, at least one processing device 202, such as a central processing unit (CPU). A variety of processing devices are available from a variety of manufacturers, for example, Intel or Advanced Micro Devices. In this example, the computing device 200 also includes a system memory 204, and a system bus 206 that couples various system components including the system memory 204 to the processing device 202. The system bus 206 is one of any number of types of bus structures including a memory bus, or memory controller; a peripheral bus; and a local bus using any of a variety of bus architectures.

Examples of computing devices suitable for the computing device 200 include a desktop computer, a laptop computer, a tablet computer, a mobile device (such as a smart phone, an iPod® mobile digital device, or other mobile devices), or other devices configured to process digital instructions.

The system memory 204 includes read only memory 208 and random access memory 210. A basic input/output system 212 containing the basic routines that act to transfer information within the computing device 200, such as during start up, is typically stored in the read only memory 208.

The computing device 200 also includes a secondary storage device 214 in some embodiments, such as a hard disk drive, for storing digital data. The secondary storage device 214 is connected to the system bus 206 by a secondary storage interface 216. The secondary storage devices and their associated computer readable media provide nonvolatile storage of computer readable instructions (including application programs and program modules), data structures, and other data for the computing device 200.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 214 or memory 204, including an operating system 218, one or more application programs 220, other program modules 222, and program data 224.

In some embodiments, the computing device 200 includes input devices to enable a user to provide inputs to the computing device 200. Examples of input devices 226 include a keyboard 228, pointer input device 230, microphone 232, and touch sensitive display 240. Other embodiments include other input devices 226. The input devices are often connected to the processing device 202 through an input/output interface 238 that is coupled to the system bus 206. These input devices 226 can be connected by any number of input/output interfaces, such as a parallel port, serial port, game port, or a universal serial bus. Wireless communication between input devices and interface 238 is possible as well, and includes infrared, Bluetooth® wireless technology, 802.11a/b/g/n, cellular, or other radio frequency communication systems in some possible embodiments.

In this example embodiment, a touch sensitive display device 240 is also connected to the system bus 206 via an interface, such as a video adapter 242. The touch sensitive display device 240 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 240, the computing device 200 can include various other peripheral devices (not shown), such as speakers or a printer.

When used in a local area networking environment or a wide area networking environment (such as the Internet), the computing device 200 is typically connected to the network 250 through a network interface, such as a wireless network interface 246. Other possible embodiments use other communication devices. For example, some embodiments of the computing device 200 include an Ethernet network interface, or a modem for communicating across the network.

In some examples, the computing device 200 includes a power supply 252 that provides electric power to several components and elements of the computing device 200. Examples of the power supply 252 include AC power supplies, DC power supplies, and batteries, either disposable or rechargeable.

The computing device 200 typically includes at least some form of computer-readable media. Computer readable media includes any available media that can be accessed by the computing device 200. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 200.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 8:
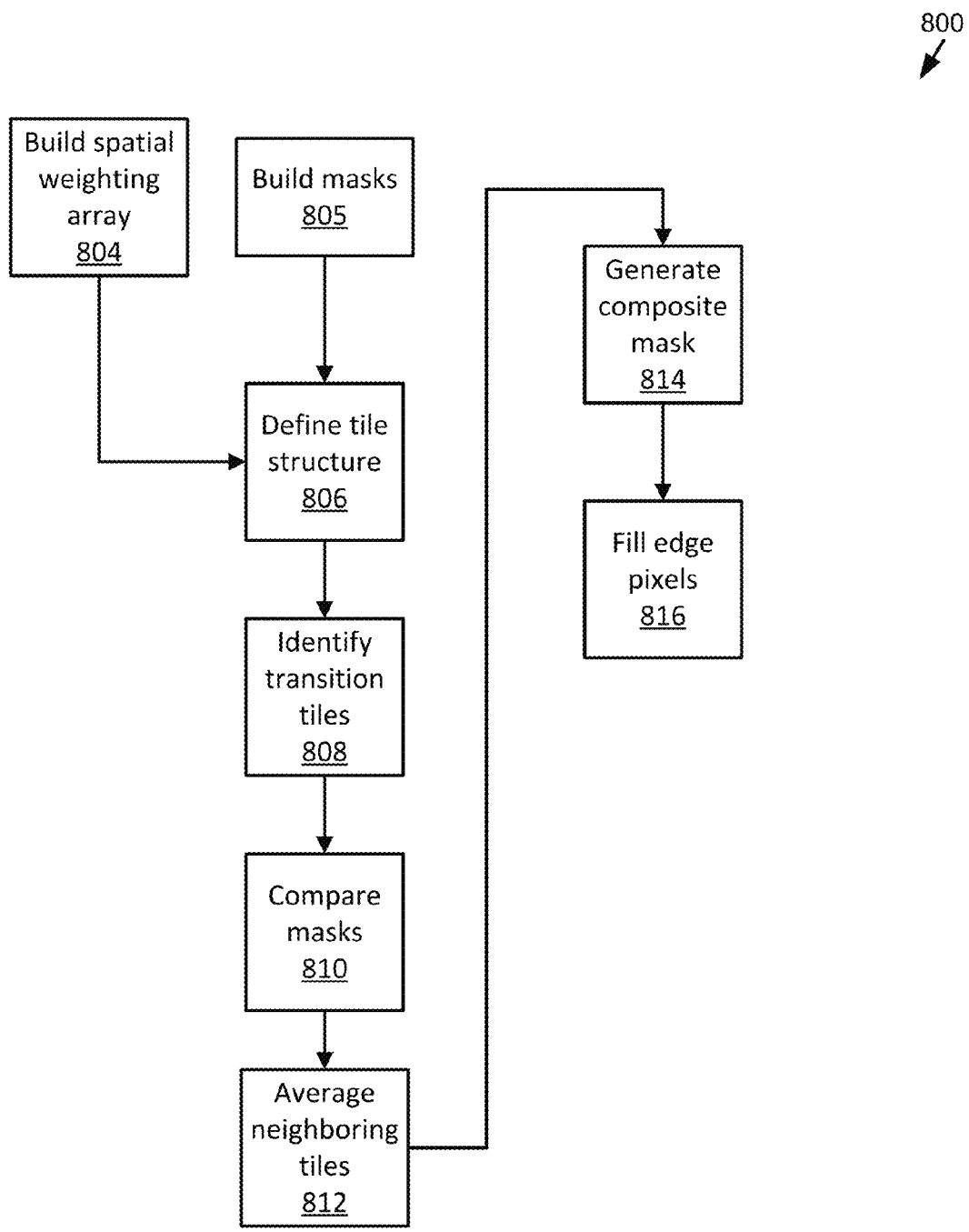
FIG. 8 is an embodiment of a method for generating a composite mask using two images.

FIG. 8 is an embodiment of an example method 800 for generating a composite mask using two captured images. The embodiment 800 includes building a spatial weighting array (operation 804), building masks (operation 805), defining tile structure (operation 806), identifying transition tiles (operation 808), comparing masks (operation 810), averaging adjacent tiles (operation 812), generating a composite mask (operation 814), and filling edge pixels (operation 816). Other embodiments can include more or fewer operations. Other embodiments can use more than two captured images.

Figure 9:
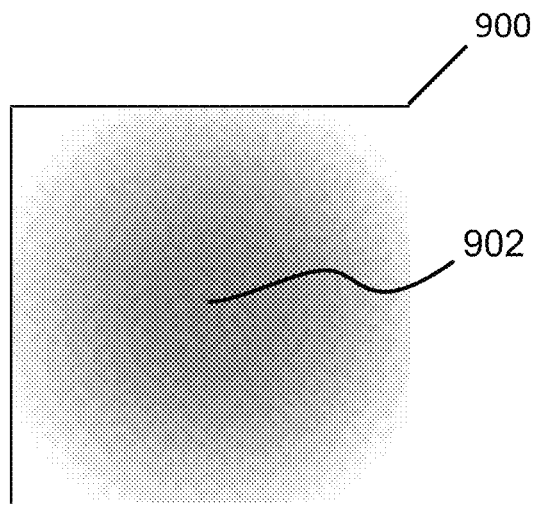
FIG. 9 illustrates an example spatial weighting array used in the method shown in FIG. 8.

The example method 800 begins by building a spatial weighting array (operation 804). In fact, operation 804 can be performed before any images are captured. Additionally, the same spatial weighting array can be used for generating more than one composite mask. The spatial weighting array is a two-dimensional filter that has a minimum value at its center and a maximum value at its edges. An example spatial weighting array 900 is shown in FIG. 9. Other types of filters can be used.

As seen in FIG. 9, the spatial weighting array 900 is square. Other shapes are possible. The lowest value, 1 in the embodiment of example 900, is at the centroid 902 of the spatial weighting array 900, and the highest value, 2, is at the corners of the spatial weighting array 900. Other minimum and maximum values can be used, for example, 0.001 for the minimum and 1 for the maximum, or 1 for minimum and 100 for the maximum. Other values for the minimum and the maximum are possible. In the embodiment shown, the values increase linearly for each concentric circle around the centroid 902 of the spatial weighting array 900. Alternatively, the values increase in a non-linear fashion away from the centroid 902 of the spatial weighting array 900.

The example method 800 also begins by building layer masks from the two background-illuminated images captured as part of image capture 610 (operation 805). Generally, the layer masks are a separate file created based on a captured image, where each pixel in the captured image is assigned a brightness value from 0 to 255 in the corresponding mask. The output from operation 805 is a mask from the first background-illuminated image, termed Mask1 for this disclosure, and a mask from the second background-illuminated image, termed Mask2 for this disclosure. Each mask has a width and a height.

Next, a tile structure is defined for each of Mask1 and Mask2 (operation 806). Each mask is divided into tiles and each tile in this embodiment has a width of ten pixels and a height of ten pixels. Other sizes of tiles, including tiles that are not square, are possible.

Figure 10:
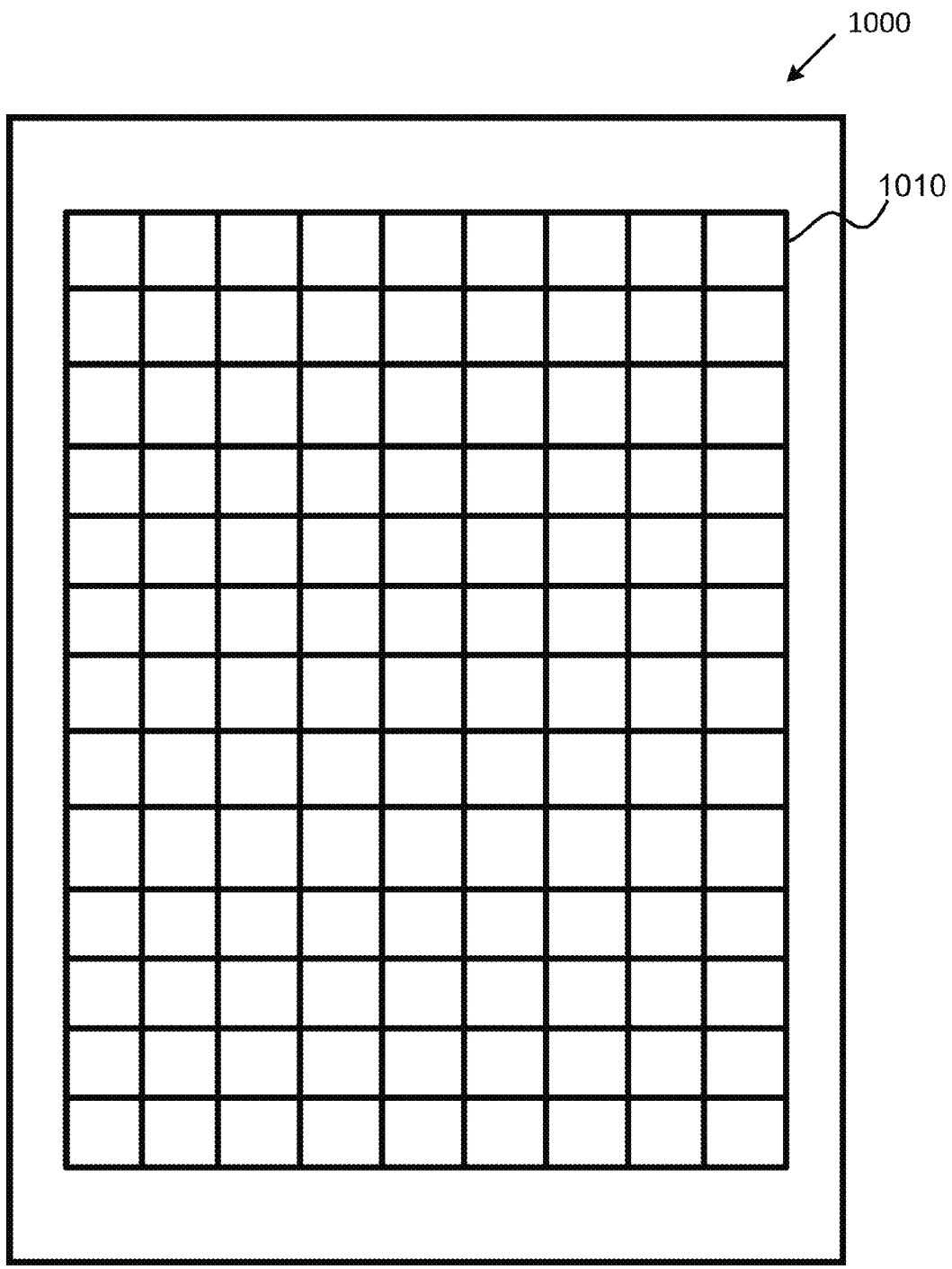
FIG. 10 illustrates an example tile used in the method shown in FIG. 8.

An embodiment of an example mask 1000 shown in FIG. 10 has been divided into tiles 1010. The number of horizontal tiles is determined by dividing the mask width by the width of the tiles. Similarly, the number of vertical tiles is determined by the mask height divided by the height of the tiles. As depicted, the tiles 1010 do not extend to the edges of the mask. In other embodiments, the entirety of the mask 1000 is divided into tiles 1010. In other embodiments, the tiles extend to the horizontal edges of the mask. Alternatively, in other embodiments, the tiles extend to the vertical edges of the mask. Other masks can have more or fewer tiles 1010.

Each tile 1010 has a width and height of 10 pixels. Each pixel in each tile 1010 in mask 1000 includes two data: the brightness value between 0 and 255 and a location identifier, such as (x, y) coordinates. These values are not shown in the embodiment of example mask 1000 shown in FIG. 10. Each tile has a center pixel, which is determined by finding the centroid of the tile or the intersection of two diagonals of the tile.

After defining the tile structure (operation 806), next the transition tiles are identified (operation 808). Operation 808 includes defining a computer structure containing additional information about each tile. This computer structure, which can be more than one computer structure in other embodiments, includes one or more of the following values: maximum value, minimum value, transition, vertical offset, horizontal offset, vertical offset average, and horizontal offset average. The transition tiles are the tiles in the mask that contain transitions between the background and the subject. Vertical offset, horizontal offset, vertical offset average, and horizontal offset average are discussed below with reference to operations 810, 812 and 814.

The maximum value is the largest pixel value in the tile, where the value is between 0 and 255 in the embodiment of the example mask 1000. The minimum value is the smallest pixel value in the tile. As noted above, each pixel additionally includes location data. Thus, the maximum value and the minimum values each correspond to a specific location in the tile or in the mask 1000.

In embodiments, the transition tiles in the mask 1000 are determined by subtracting the minimum value from the maximum value for each tile in the mask 1000. This difference is then compared to a threshold and if it is greater than or equal to the threshold, it is determined to be a transition tile.

The transition tiles can also be determined by comparing the maximum value of each tile to a maximum transition value and by comparing the minimum value of each tile to a minimum transition value. If the maximum value is greater than or equal to the maximum transition value and if the minimum value is less than or equal to the minimum transition value, then the tile is determined to be a transition tile. In this embodiment, transition tiles are only identified for Mask1, although in alternate embodiments transition tiles are also identified for Mask2.

Next, the transition tiles of Mask1 are compared to the tiles of Mask2 (operation 810) to determined how much motion has occurred between Mask1 and Mask2. In this operation, a transition tile in Mask1 is compared to a set of tiles in Mask 2 that surround the tile that corresponds to the same location as in Mask 1. An embodiment of the example is shown in FIGS. 11A-11C, which show three snap-shots of a progression of comparisons between a transition tile 1015 to a corresponding size in a matrix 1030, and FIG. 12, which shows how the spatial weighting array 900 can be applied to the comparison.

Figure 11A:
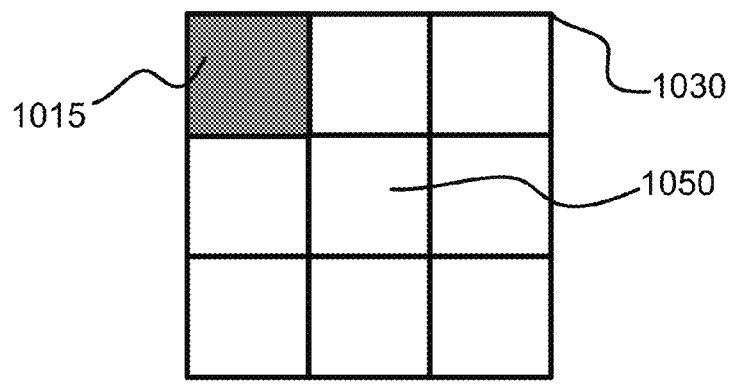
FIG. 11A illustrates a first comparison of a first mask to a second mask in the method shown in FIG. 8.

FIG. 11A shows a transition tile from Mask1 1015 being compared to a 3 by 3 set of tiles 1030 from Mask 2. The location of the center pixel in tile 1015 corresponds to the location of the center pixel in tile 1050 from Mask2. Thus, each pixel in tile 1015 has the same location as each pixel in tile 1050. In order to identify any motion of the subject between the images used to produce Mask1 and Mask2, the pixels in tile 1015 are compared to the pixels in the correspondingly-located tile 1050 plus eight surrounding tiles. In other embodiments, the tile 1015 from Mask1 can be compared to more or fewer tiles in Mask2.

As shown in FIG. 11A, the comparison begins with the upper-left most tile in the 3 by 3 matrix from Mask2 1030. Each brightness value for each pixel in tile 1015 is subtracted from the brightness value for each pixel in the same spot from the 3 by 3 matrix 1030. Then, the absolute value of that difference is determined. Each absolute value is multiplied by a corresponding value from the spatial weighting array 900 to yield a modified difference value.

Figure 11B:
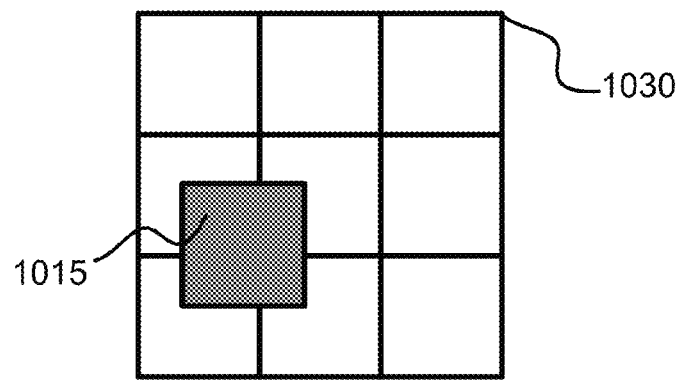
FIG. 11B illustrates a second comparison of the first mask to the second mask in the method shown in FIG. 8.
Figure 11C:
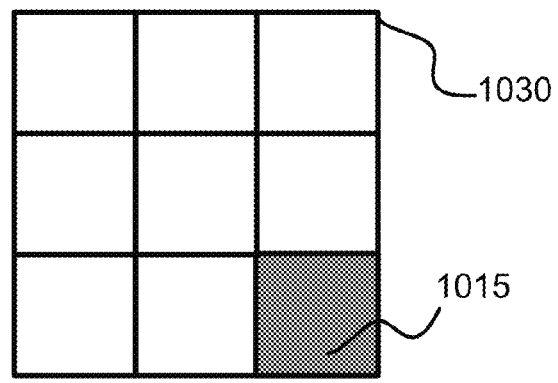
FIG. 11C illustrates a third comparison of the first mask to the second mask in the method shown in FIG. 8.
Figure 12:
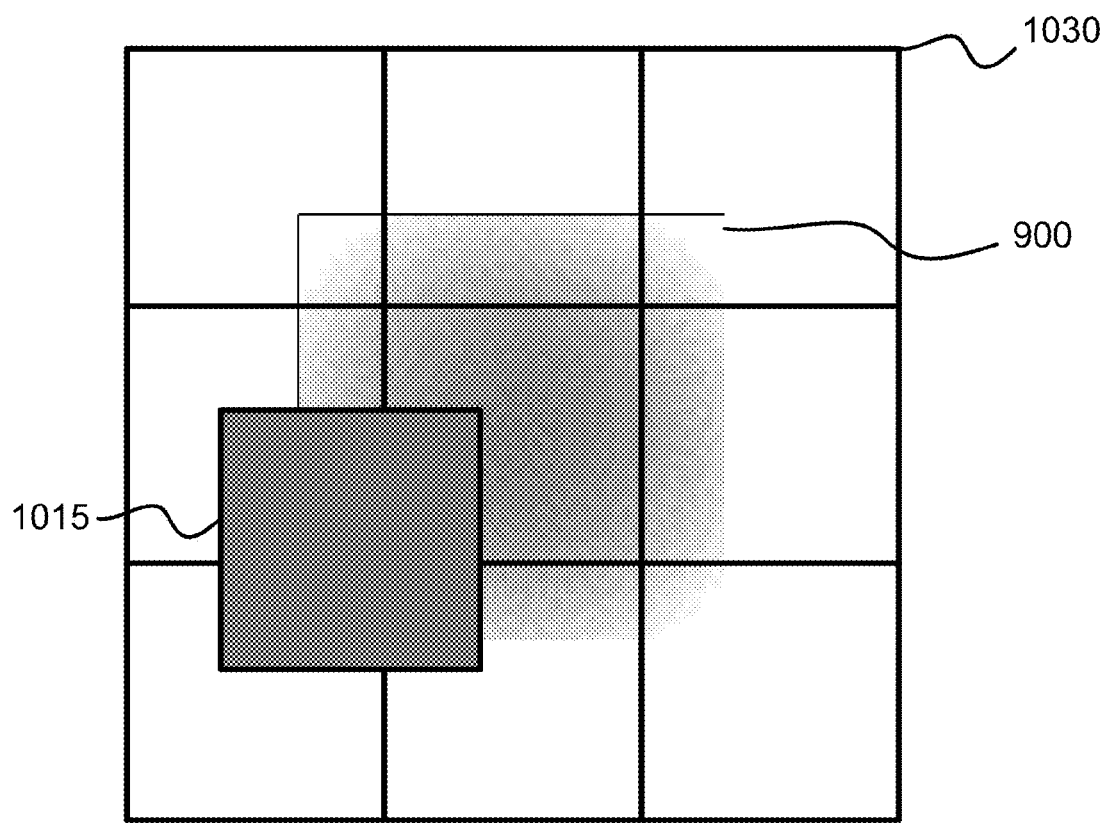
FIG. 12 illustrates an application of the spatial weighting filter shown in FIG. 9 during the method shown in FIG. 8.

As shown in FIG. 12, which shows tile 1015 and matrix 1030 and corresponds to FIG. 11B, the spatial weighting array 900 is centered in the 3 by 3 matrix 1030. Other relative positions of the spatial weighting array 900 in 3 by 3 matrix 1030 are possible. Also, the spatial weighting array 900 is depicted as reaching into the eight perimeter tiles. Any locations outside the spatial weighting array 900 in FIG. 12 are assigned the maximum value. In other embodiments, the spatial weighting array 900 has a more gradual increase in values from the center of the matrix 1030 to the corners than that shown in FIG. 12.

Then each of the modified difference values are summed to yield a comparison value. In the embodiment shown, each tile is ten pixels by ten pixels, thus, the comparison value is the sum of one hundred differences, where the absolute value is found for each difference before summation.

Next, the transition tile 1015 shifts the comparison one pixel to the right in the 3 by 3 matrix 1030. For operation 810, there are no divisions between tiles in the matrix 1030. Rather, the matrix 1030 is treated as having 30 pixels by 30 pixels. Thus, the operation 810 next compares a 10 by 10 square of pixels in matrix 1030 to the pixels in transition tile 1015. Again, one hundred differences are found, the absolute value of each is determined, and those absolute values are summed to yield another comparison value.

This process repeats, moving the comparison of transition tile 1015 to the pixels in matrix 1030 by one pixel each time until the ten right-most pixels in matrix 1030 are compared. Thus, twenty one comparison values are obtained for the top ten rows of matrix 1030. Then, the comparison shifts down by one pixel and repeats for the next rows of matrix 1030. FIG. 11B shows a transition tile 1015 being compared to a ten-by-ten area of matrix 1030. As depicted, the transition tile 1015 is being compared to a ten-by-ten area roughly two thirds down from the top row of matrix 1030 and about one fifth from the left-most column of matrix 1030.

Obtaining comparison values and shifting the 10 pixel by 10 pixel comparison area repeats until 441 comparison values are obtained for the transition tile 1015. FIG. 11C shows the last comparison between the transition tile 1015 and the lower-right ten-by-by pixel area. Other embodiments where the tile size is different are modified accordingly.

When all comparison values are obtained, the area of Mask2 that most likely corresponds to the pixels from Mask1 is then determined. This can be accomplished by determining the minimum comparison value of all the comparison values calculated for the 3 by 3 matrix.

A vertical offset and horizontal offset are also calculated during operation 810. The vertical offset is the vertical location where the minimum value for the tile was located subtracted by the vertical location of the center pixel of the Mask1 tile. The horizontal offset is the horizontal location where the minimum value for the tile was located subtracted by the horizontal location of the center pixel of the Mask1 tile. In effect, the vertical offset and the horizontal offset are used to determine how much the subject shifted from the images used to create Mask1 and Mask2. In the embodiment 800, the vertical offset and the horizontal offset information is added to the computing structure for each tile.

Next, adjacent tiles are averaged (operation 812). This operation is optional. In operation 812, the horizontal and vertical offsets of adjacent transition tiles are averaged to minimize possible discontinuities in the composite mask generated in operation 814. One challenge when compensating for subject motion is that different parts of the subject may have moved in different directions between images. Also, as the offsets of more tiles are averaged, those calculated averages represent the actual motion with decreasing precision.

The horizontal and vertical offsets can be averaged in different ways and using differing numbers of tiles. In embodiments, for each tile the offset averages are calculated by averaging the horizontal and vertical offset values of up to five tiles that are adjacent to and above the tile, the tile itself, and up to five tiles that are adjacent to and below the tile. In other embodiments, the offset averages are calculated for each tile by averaging the horizontal and vertical offset values of up to eight transition tiles adjacent to and surrounding the tile and including the tile. In other embodiments, the offset averages are calculated for each tile by averaging the horizontal and vertical offset values of up to five tiles that are adjacent to and to the right of the tile, the tile itself, and up to five tiles that are adjacent to and to the left of the tile. In those embodiments, then, the vertical and the horizontal offset values are calculated by averaging the values from eleven tiles. More or fewer numbers of transition tiles can be used in the calculation of the average vertical offset and the average horizontal offset. Different arrangements of adjacent transition tiles can be selected for inclusion in the averages.

The next operation in embodiment of example method 800 is the generation of a composite mask (operation 814). The composite mask is a mask that represents the location of the subject when an image was captured during the subject illumination, an example of which is image 614 in FIG. 6. As discussed above, the subject-illuminated image is captured at the midpoint in time between the images used to produce Mask1 and Mask2. Thus, the composite mask roughly approximates a spatial average between the images used to produce Mask1 and Mask2.

When populating the composite mask, the pixel value between 0 and 255 at a horizontal location h and vertical location v is determined using the following formula:

$$\tfrac{1}{2}\{Mask1 Value\} + \tfrac{1}{2}\{Mask2 Value\}$$

where: Mask1 Value is the value of the pixel at ([h—horizontal offset average$_1$], [v—vertical offset average$_1$]);
horizontal offset average$_1$ is the horizontal offset average for the pixel at (h, v) in Mask1;
vertical offset average$_1$ is the vertical offset average for the pixel at (h, v) in Mask1;
Mask2Value is the value of the pixel at ([h—horizontal offset average$_2$], [v—vertical offset average$_2$]);
horizontal offset average$_2$ is the horizontal offset average for the pixel at (h, v) in Mask2; and
vertical offset average$_2$ is the vertical offset average for the pixel at (h, v) in Mask2.

During operation 814, the calculation above is performed for each tile and at each location (h, v) in each tile. For any composite mask values that are not in a tile, such as near the edges in some embodiments, those values are populated in operation 816.

In operation 816, any edge pixels not included in the tile structure, an example of which is in FIG. 10, are populated using the values from either Mask1 or Mask2.

In other embodiments, not shown in the figures, more than three images are captured. For instance, four images could be captured. The four images could be used to determine a subject's acceleration and generate a composite mask accordingly. For example, when a subject is one or more persons and the one or more persons are in the act of jumping during image capture, the subject will have a non-linear rate of movement between the images. This non-linear movement could be compensated by example method 800.

The non-linear movement could also be compensated for by capturing three background-illuminated images and one subject-illuminated image at the same time intervals. Then, by comparing the movement of the subject in the three background-illuminated images, the acceleration of the subject can be estimated and fit to a curve. The curve can then be used to generate a composite mask at the time the subject-illuminated image was captured.

In other embodiments, more than one subject-illuminated image can be captured. For example, four images could be captured: a first background-illuminated image, a first subject-illuminated image where the subject is illuminated by the main light, a second background-illuminated image, and a second subject-illuminated image where the subject is illuminated by the fill light. Alternatively, the main light can be used for both subject-illuminated image captures.

Another example is capturing three images: two subject-illuminated images and one background-illuminated image. In those embodiments, mask generation is completed using algorithms that evaluate the color of the background and the subject. Backgrounds with saturated color and minimal texturing can be used, and background colors that are typically not found in the subject can also be used. In those embodiments, a background texture with minimal or no changes in a localized area might be optimal in aiding the distinction between subject and background.

A mask can be generated from the background-illuminated image. Then, the positioning of the mask can be adjusted by comparing the two subject-illuminated images and determining the subject movement between the two subject-illuminated images. In other words, the algorithm would determine the localized movement of the subject between the first and second subject-illuminated images and adjust the mask generated from the background-illuminated image accordingly. Additionally, the mask generated from the background-illuminated image can be used to focus the algorithm's motion determinations on the likely portions of the subject-illuminated image where there is a subject-background transition. In this respect, the algorithm does not need to compare all pixels of the two subject-illuminated images, only those that are near the subject-background transition in the mask generated from the background-illuminated image.

In still other embodiments, an additional image is captured where the background lights and the subject lights are not illuminated. A purpose for capturing an image without any of the lighting elements illuminated is to measure and subtract ambient lighting from the images. This may be necessary as the f-stop value is lower and/or when capturing images in environments where the ambient lighting conditions cannot be fully or partially controlled.

Figure 13:
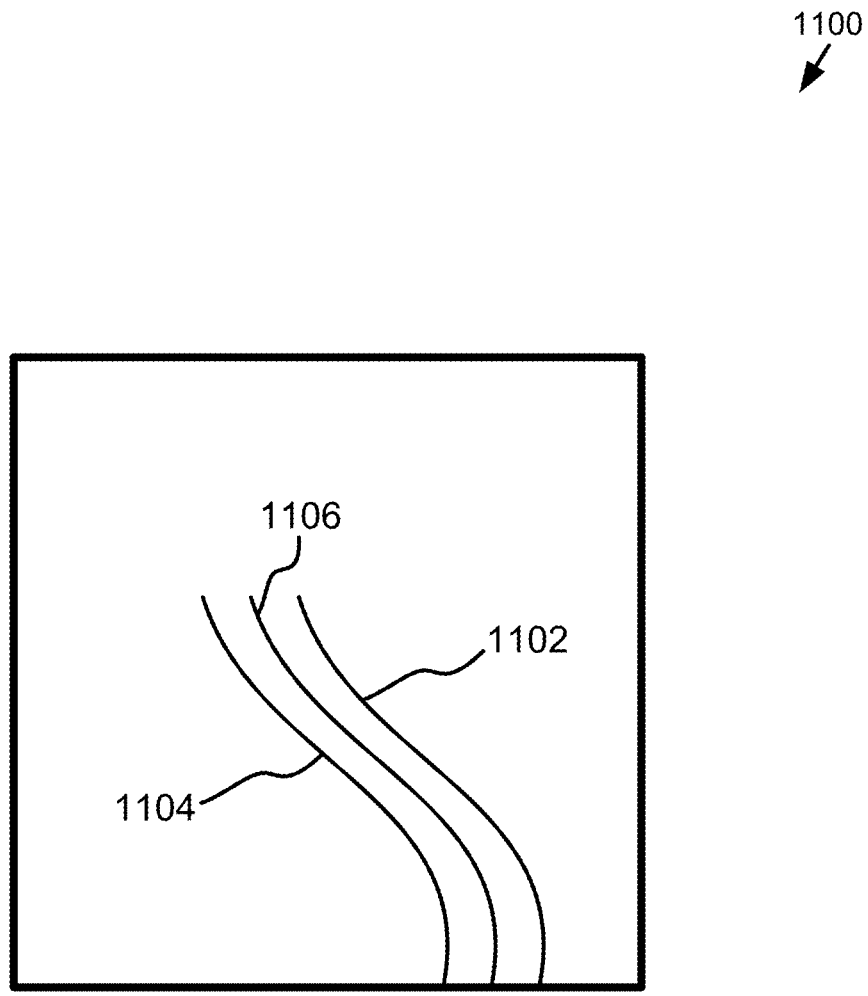
FIG. 13 illustrates an expanded view of a compensation for subject motion between two image captures.

FIG. 13 is an example expanded view of a compensation for subject motion between two image captures 1100. The zoomed-in snapshot 1100 shows one part of an image including an end portion of a hair. Line 1102 is a subject's hair at a position when a first image of the subject was captured, such as during a first background-illuminated image capture. Line 1104 is the same strand of hair when a third image of the subject was captured, such as during a second background-illuminated image capture.

Line 1106 is the calculated position of the same strand of hair during a second image capture of the subject, such as the subject-illuminated image capture. The second image capture of the subject is equally spaced in time between the first and the third image captures. In the example 1100, line 1106 was calculated using the embodiment of example method 800 discussed above. Line 1106 is part of the composite mask generated in embodiment of example method 800.

Figure 14:
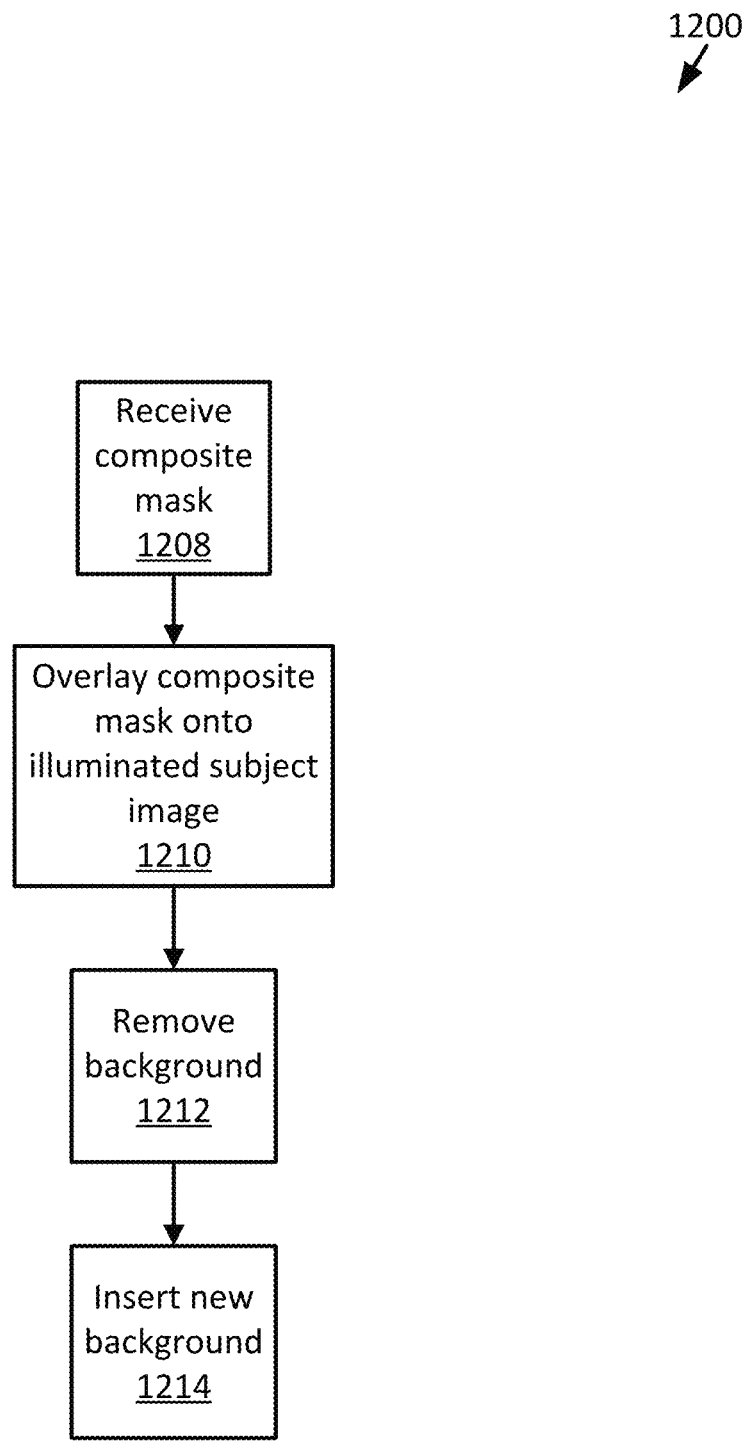
FIG. 14 is an embodiment of a method of using a composite mask.

FIG. 14 is an embodiment of an example method 1200 of using a composite mask. The embodiment of example method 1200 includes receiving a composite mask (operation 1208), overlaying the composite mask onto the illuminated subject image (operation 1210), removing the background (operation 1212), and inserting a new background (operation 1214). Other embodiments can include more or fewer steps.

The example method 1200 begins by receiving the composite mask (operation 1208) generated by the example method 800 discussed above. The user conducting or directing the operations in example method 1200 can be different from the user who initiated the example method 800.

After the composite mask is received (operation 1208), the composite mask is overlayed onto the subject-illuminated image (operation 1210). The composite mask should have equal to, or close to, a 1-to-1 correspondence in position with the subject in the subject-illuminated image. The composite mask has the same width and height dimensions in pixels as the subject-illuminated image. Thus, in one embodiment, one corner pixel of the composite mask can be aligned with the corresponding corner pixel of the subject-illuminated image.

Then the background is removed (operation 1212). The background is any portion of the subject-illuminated image that is not covered by the composite mask.

At some point after the background is removed (operation 1212), a new background is inserted (operation 1214). In school portrait embodiments, the background can be selected after a customer sees the subject-illuminated image without the background. For example, the customer could select multiple possible backgrounds and identify one that they prefer given the subject's clothing, hair color, eye color, etc. In products-as-subjects embodiments, a marketing department might decide upon a proper background for the subject-illuminate image.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of illuminating a subject during a photography session, comprising:
    receiving an image capture signal; and
    after receiving the image capture signal, initiating an illumination sequence for a single image capture sequence, including:
        initiating a first illumination condition while a first image is captured;

initiating a second illumination condition while a second image is captured; and initiating the first illumination condition while a third image is captured, wherein at least one of the first and the second illumination conditions is an illumination of the subject using a subject lighting system, and wherein the other is an illumination of a background using a background lighting system;

wherein capturing of the images occurs with equal time intervals therebetween; and wherein capturing of the images occurs in less than 100 milliseconds.

2. The method of claim 1, wherein the illumination sequence for a single image capture sequence is for a single pose of the subject.

3. The method of claim 1, wherein the capturing of the images occurs in less than about 20 milliseconds.

4. The method of claim 1, wherein the first illumination condition is the illumination of the background using the background lighting system, and wherein the second illumination condition is the illumination of the subject using the subject lighting system.

5. The method of claim 3, wherein the background lighting system is not illuminated when the second image is captured.

6. The method of claim 5, wherein the subject lighting system is not illuminated when the first image is captured and when the third image is captured.

7. A method of generating a composite mask, the method comprising:

receiving a first image of a subject representative of a first position of the subject at a first time before an event;

receiving a second image of the subject representative of a second position of the subject at a second time after the event;

identifying differences between the first image and the second image representative of movement of the subject between the first position and the second position;

estimating an intermediate position of the subject at a time of the event based at least in part on the differences between the first image and the second image, the intermediate position being between the first position and the second position; and generating the composite mask identifying the intermediate position of the subject.

8. The method of claim 7, wherein the event is the capturing of a subject-illuminated image of the subject.

9. The method of claim 8, further comprising using the composite mask to remove a background portion of the subject-illuminated image.

10. The method of claim 7, wherein the first image of the subject is a first mask generated from a first background-illuminated image of the subject; and wherein the second image of the subject is a second mask generated from a second background-illuminated image of the subject.

11. The method of claim 10, wherein the second background-illuminated image is captured within less than about 100 milliseconds of the first background-illuminated image capture.

12. The method of claim 10, wherein identifying differences between the first image and the second image comprises:

dividing the first mask into a first set of tiles;

dividing the second mask into a second set of tiles; and comparing one of the first set of tiles to one or more of the second set of tiles.

13. The method of claim 12, wherein comparing one of the first set of tiles to one or more of the second set of tiles includes using a spatial weighting array.

14. The method of claim 13, wherein estimating an intermediate position of the subject at the time of the event includes averaging one or more adjacent tiles.

15. A system for capturing and processing multiple images, comprising:

a controller;

a lighting system synchronized by the controller, the lighting system including:

a background lighting system in communication with the controller;

a subject lighting system in communication with the controller; and an image capture initiation module, wherein the controller includes a non-transitory storage medium and one or more processors, the non-transitory storage medium storing instructions that, when executed by the processor, cause the controller to:

receive an initiation signal from the image capture initiation module;

illuminate the background lighting system during a first image capture of the subject at a first time;

illuminate the subject lighting system during a second image capture of the subject at a second time; and illuminate the background lighting system during a third image capture at a third time, wherein each of the first image capture, second image capture, and third image capture are for one pose;

a mask generation system including a second non-transitory storage medium and one or more processors, the mask generation system configured to:

receive the first image capture of the subject at the first time;

receive the second image capture of the subject at the second time; and receive the third image capture of the subject at the third time.

16. The system of claim 15, wherein the second non-transitory storage medium includes instructions that, when executed by the one or more processors, cause the mask generation system to:

determine any movements of the subject between the first and second images;

estimate an intermediate position of the subject at a time of the event between the first time and the second time; and generate the composite mask at the intermediate position of the subject.

17. The system of claim 16, wherein the difference between the third time and the first time is less than about 100 milliseconds;

wherein a difference between the first time and the second time is equal to a difference between the second time and the third time;

wherein the background lighting system is not illuminated during the second image capture; and wherein the subject lighting system is not illuminated during the first image capture and the third image capture.

18. The system of claim 16, wherein the difference between the third time and the first time is less than about 20 milliseconds;

wherein a difference between the first time and the second time is equal to a difference between the second time and the third time;

wherein determining any movements of the subject between the first and second images includes:
  generating a first mask using the first image of the subject;
  generating a second mask using the second image of the subject; and
  comparing the first mask to the second mask.

19. The system of claim 18, further comprising a mirrorless digital camera configured to capture each of the first image, the second image, and the third image, wherein the mirrorless digital camera is in communication with the controller and the mask generation system.

* * * * *